(12) United States Patent
Mahar et al.

(10) Patent No.: US 7,885,921 B2
(45) Date of Patent: Feb. 8, 2011

(54) MANAGING ATOMIC UPDATES ON METADATA TRACKS IN A STORAGE SYSTEM

(75) Inventors: Aaron S Mahar, Tucson, AZ (US); Angelique R Budaya, Tucson, AZ (US); James A Springer, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 10/993,087

(22) Filed: Nov. 18, 2004

(65) Prior Publication Data
US 2006/0106891 A1   May 18, 2006

(51) Int. Cl.
*G06F 7/00* (2006.01)
*G06F 17/00* (2006.01)

(52) U.S. Cl. .................. 707/610; 707/624; 707/625; 707/674; 707/685

(58) Field of Classification Search .................. None
See application file for complete search history.

(56) References Cited

U.S. PATENT DOCUMENTS

| | | | |
|---|---|---|---|
| 4,989,136 A | | 1/1991 | Gurd et al. |
| 5,410,667 A | | 4/1995 | Belsan et al. |
| 5,590,318 A | * | 12/1996 | Zbikowski et al. ......... 707/202 |
| 5,692,181 A | * | 11/1997 | Anand et al. ............... 707/102 |
| 5,710,900 A | * | 1/1998 | Anand et al. ............... 715/764 |
| 5,721,903 A | * | 2/1998 | Anand et al. ................... 707/5 |
| 5,778,168 A | | 7/1998 | Fuller |
| 5,870,753 A | | 2/1999 | Chang et al. |
| 5,873,097 A | * | 2/1999 | Harris et al. ................ 707/203 |
| 5,897,661 A | | 4/1999 | Baranovsky |
| 6,052,759 A | | 4/2000 | Stallmo et al. |
| 6,292,869 B1 | | 9/2001 | Gerchman et al. |
| 6,298,425 B1 | | 10/2001 | Whitaker et al. |
| 6,308,182 B1 | | 10/2001 | Nishigaya et al. |
| 6,339,793 B1 | | 1/2002 | Bostian et al. |
| 6,425,050 B1 | * | 7/2002 | Beardsley et al. ........... 711/113 |

(Continued)

FOREIGN PATENT DOCUMENTS

EP   1193899   4/2002

(Continued)

OTHER PUBLICATIONS

Carrano, Frank M.; and Janet J . Prichard; Data Abstraction and Problem Solving with C++: Walls and Mirrors; 3rd Ed; Addison Wesley, New York: 2002; pp. 272-277.*

*Primary Examiner*—Tim T. Vo
*Assistant Examiner*—Garrett Smith
(74) *Attorney, Agent, or Firm*—Dan Shifrin (57) ABSTRACT

Methods, systems, computer program products and methods for deploying computing infrastructure for managing metadata in a storage subsystem are provided. A first metadata track is staged from disk storage to a cache storage after which a journal entry is stored in a nonvolatile storage (NVS). The journal entry includes an opcode and update data for the track. The opcode identifies the type of update to be performed and the number of tracks to be updated in the operation. Each of the other metadata tracks is staged and a corresponding journal entry stored. The journaled updates are then applied to the respective metadata track in the cache storage and the tracks destaged from cache to the disk storage.

9 Claims, 11 Drawing Sheets

U.S. PATENT DOCUMENTS

| | | |
|---|---|---|
| 6,438,661 B1 | 8/2002 | Beardsley et al. |
| 6,502,174 B1 | 12/2002 | Beardsley et al. |
| 6,697,846 B1 | 2/2004 | Soltis |
| 6,714,930 B1 | 3/2004 | Garrison et al. |
| 6,725,392 B1 | 4/2004 | Frey et al. |
| 6,751,705 B1 | 6/2004 | Solomon et al. |
| 6,769,124 B1 | 7/2004 | Schoening et al. |
| 2002/0112125 A1 | 8/2002 | Copeland et al. |
| 2002/0156840 A1* | 10/2002 | Ulrich et al. ............... 709/203 |
| 2003/0088750 A1 | 5/2003 | Wu et al. |
| 2003/0093770 A1 | 5/2003 | Fernandez |
| 2003/0177130 A1 | 9/2003 | Todd |
| 2004/0126750 A1* | 7/2004 | Theilmann et al. .......... 434/362 |
| 2007/0061385 A1* | 3/2007 | Clark et al. ................. 707/204 |

FOREIGN PATENT DOCUMENTS

| | | |
|---|---|---|
| WO | WO 03/028293 | 9/2002 |

\* cited by examiner

MANAGING ATOMIC UPDATES ON METADATA TRACKS IN A STORAGE SYSTEM

RELATED APPLICATION DATA

The present application is related to commonly assigned and copending U.S. application Ser. Nos. 10/993,092, entitled SELECTIVE CLEARING OF PERSISTENT METADATA IN A STORAGE SUBSYSTEM; 10/993,022, entitled MANAGEMENT OF METADATA IN A STORAGE SUBSYSTEM; 10/993,048, entitled CLEARING METADATA TRACKS IN A STORAGE SYSTEM, filed on the filing date hereof, which applications are incorporated herein by reference in their entirety.

TECHNICAL FIELD

The present invention relates generally to enterprise storage systems and, in particular, to efficiently and securely managing global metadata.

BACKGROUND ART

Enterprise computing systems typically include one or more host systems for processing customer data and running application programs, direct access storage devices (DASDs) for storing the data, and one or more storage controllers for directing the storage and retrieval of data between the host(s) and the DASDs. In addition to the customer data, the storage controller typically maintains metadata which provides information about tracks or blocks of data in the DASD or in cache storage in the storage controller. The storage controller processes the metadata during certain operations on the customer data represented by the metadata to improve the speed and efficiency with which requested operations are performed. During DASD initialization, metadata is staged from disk to a cache storage (a volatile type of storage). A power failure or certain other types of errors may cause the contents of the cache to be lost.

Certain storage controllers, such as the IBM™ Enterprise Storage Server™ (ESS) controller, may be configured with copy services functionality, including (but not limited to) flash copy, peer-to-peer remote copy, extended remote copy, and concurrent copy which assist in backing up data and recovering from disasters. During a copy service (CS) operation, multi-field CS metadata is generated and maintained by the storage controller. The CS metadata includes information about the state of a copy services operation at any point in time, such as internal settings, source and destination addresses, and other data about the state of data being copied. Consequently, if a controller loses power or encounters some other interrupting event, the controller may be restarted, the metadata read, the CS operation restored to the point of interruption and then resumed and completed.

In an earlier version of the IBM ESS controller, the CS metadata was maintained in a 26 KB in-memory structure that was updated directly by the clients. During an update, the entire structure was written to disk, even if only a few fields were update, and no record was kept of which fields of the metadata were changed. In a subsequent version, the 26 KB structure of CS control data was mapped to seven 8 KB metadata tracks. During an update, only a metadata track containing an updated field was written to the disk.

Journaling has been implemented to allow storing updates in non-volatile storage (NVS), improving update performance and maintaining the metadata in the event of a power loss or other significant event. Each metadata track has a corresponding page in NVS which includes a chain of blocks containing a sequence of journal entries identifying an operation being performed and the data in cache being modified. During a recovery operation, the metadata may be staged from disk to cache and the changes previously recorded in the journal entries applied, thereby restoring the metadata to have the most current version of data. Because some CS functions store control data to multiple metadata tracks, an update to the tracks should be performed to all of them ("atomically") in a proper sequence with safeguards to protect against metadata corruption if a failure occurs before all of the tracks have been updated.

Consequently, it remains desirable for more efficient management of atomic updates of multiple global metadata tracks.

SUMMARY OF THE INVENTION

The present invention provides methods for managing metadata in a storage subsystem. A first metadata track is staged from disk storage to a cache storage after which a journal entry is stored in a nonvolatile storage (NVS). The journal entry includes an opcode and update data for the track. The opcode identifies the type of update to be performed and the number of tracks to be updated in the operation. Each of the other metadata tracks is staged and a corresponding journal entry stored. The journaled updates are then applied to the respective metadata track in the cache storage and the tracks destaged from cache to the disk storage.

In one embodiment, if an interruption is encountered while the atomic update is being performed, a determination is made whether journal entries have been made for all of the metadata tracks. If so, each journaled update is applied to the respective track in cache to complete the update process. If fewer than all of the journal entries have been made, the journal entries which were made are discarded. The opcode may also includes a generation number common to the tracks to be updated. Prior to staging the first metadata track, the largest generation number in the tracks is determined and then incremented, becoming the new generation number. In the event of an interruption, determining if journal entries have been made for all of the metadata tracks may include searching for all of the journal entries having the new (incremented) generation number.

In another embodiment, after the journal entries are made to NVS for each of the metadata tracks except for the last track, the journal entry is applied to an in-flight storage area. After the journal entry is made to NVS for the last of the metadata tracks, the journaled update for the last metadata track is applied to the respective metadata track in the cache storage which is then destaged from the cache to the disk storage. Then, in an order which is the reverse of the order in which journal entries were stored: the metadata tracks are staged to the cache, a second journal entry is stored in NVS, the update data stored in the in-flight area is applied to the metadata track in cache storage, and the metadata track is destaged from cache to the disk storage. The second journal entry includes a generation number and the opcode. Preferably, the in-flight area is part of the disk storage which contains customer data and metadata.

The present invention also provides systems, computer program products and methods for deploying computing infrastructure for managing global metadata in a storage subsystem.

DETAILED DESCRIPTION OF THE PREFERRED EMBODIMENT

Figure 1:
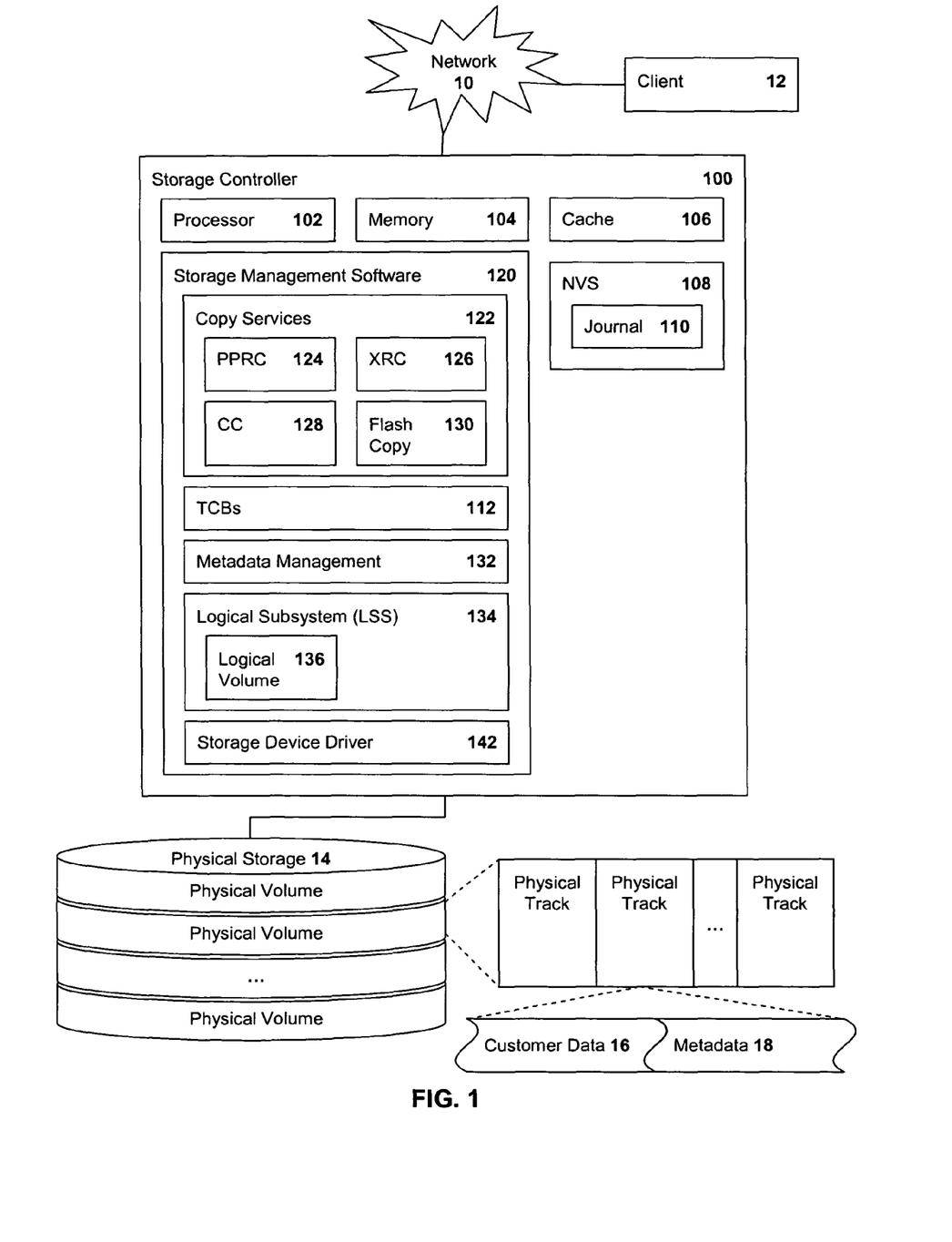
FIG. 1 is a block diagram of a metadata management system of the present invention.

FIG. 1 is a block diagram of a storage controller 100 implementing metadata management of the present invention. The controller 100 is attached, through a network 10, to at least one client system 12, such as a host device. The controller 100 is also attached to at least one storage device 14, such as direct access storage devices (DASDs).

The controller 100 includes a processor 102, general memory 104 for storing computer-readable code having instructions executable by the processor 102, a cache storage 106 and non-volatile storage (NVS) 108. The NVS 108 includes a journaling area 110; the controller 100 further includes storage management software 120 which may actually be stored in the memory 104. The storage management software 120 may include copy services (CS) code 122 and metadata management code 132. Copy services code 122 may include, but not be limited to, a peer-to-peer remote copy (PPRC) function 124, an extended remote copy (XRC) function 126, concurrent copy (CC) function 128 and/or a flash copy or point-in-time copy function 130. Such services assist in backing up data, copying data and recovering from disasters.

The storage management software 120 further includes task control blocks 112, one or more logical subsystems (LSS) 134, configured into one or more logical volumes 136, and a storage device driver 142. In some storage controllers, both the cache 106 and the NVS 108 may be microcode constructs within the memory 104, configured by, and considered to be a part of, the device driver 142.

The storage device 14 may be configured into tracks having both customer data 16 and metadata 18. As previously noted, metadata may be either global, stored separate from the corresponding customer data (as illustrated in FIG. 1), or segmented, stored with the corresponding customer data.

Figure 2:
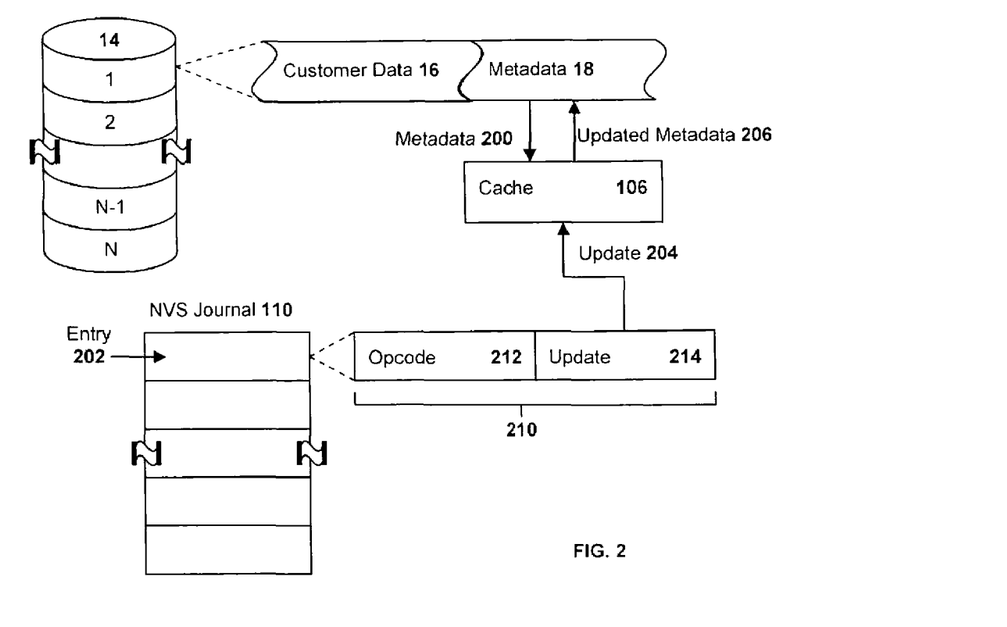
FIG. 2 is a schematic representation of a metadata update of the present invention.

FIG. 2 is a schematic representation of a metadata update of the present invention. A first metadata track 18 is staged 200 from the disk storage 14 to the cache 106 of the storage controller 100. A journal entry 210 is stored 202 in the NVS journal area 110. The journal entry 210 includes an opcode 212 and update data 214. The opcode 212 identifies the type of update to be performed and the number of tracks to be updated in the operation. The journal entry 210 and the opcode 212 may include other information as well. The update 210 is applied 204 to the metadata in the cache 106 after which the updated metadata is destaged 206 back to the disk storage 14.

FIGS. 3A-3E are sequential schematic representations of an embodiment of a metadata update of the present invention.

A generation number 20 is assigned to metadata tracks and used to identify all tracks participating in a particular multi-track update operation. Preferably, the generation number 20 is stored in the track and in journal entries. At the beginning of a multi-track update operation, the metadata tracks are scanned to identify the largest generation number which is extracted from the tracks and incremented for use as the generation number for the update operation (it will be appreciated that the generation number may instead be incremented at the end of an update operation). Additionally, opcodes are used to identify type of multi-track operations (such as copy services, cache and fixed-block), the number of tracks involved in each operation and an indication of how to map the updates to the metadata tracks. Opcodes are stored in journal entries along with the generation numbers. Thus, the generation number and opcode in a journal entry may be used to identify all tracks participating in a multi-track operation.

Figure 3A:
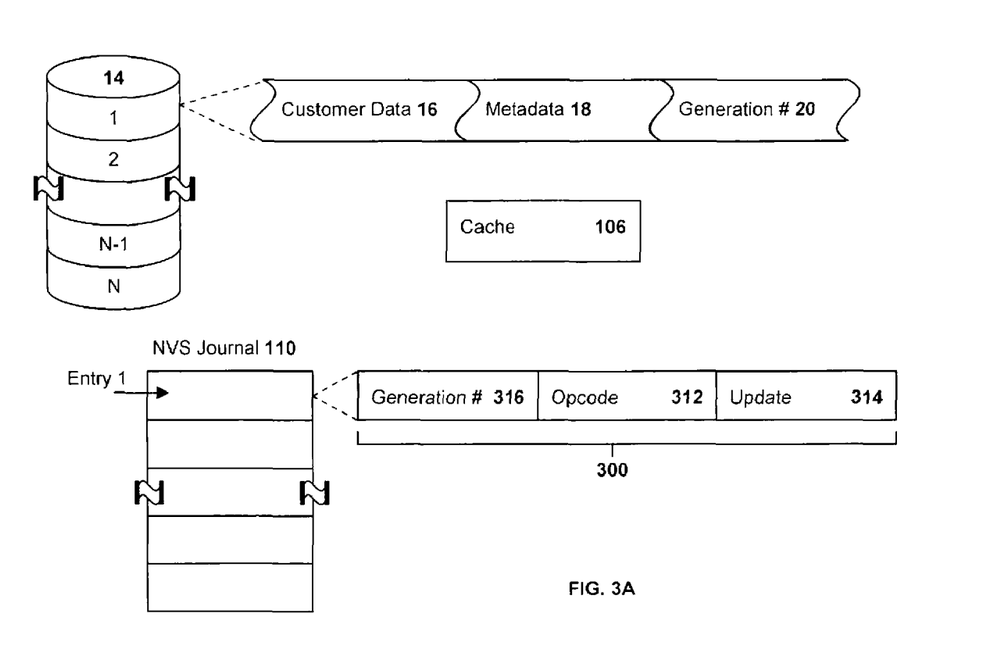
FIGS. 3A-3E are sequential schematic representations of an embodiment of a metadata update of the present invention.
Figure 3B:
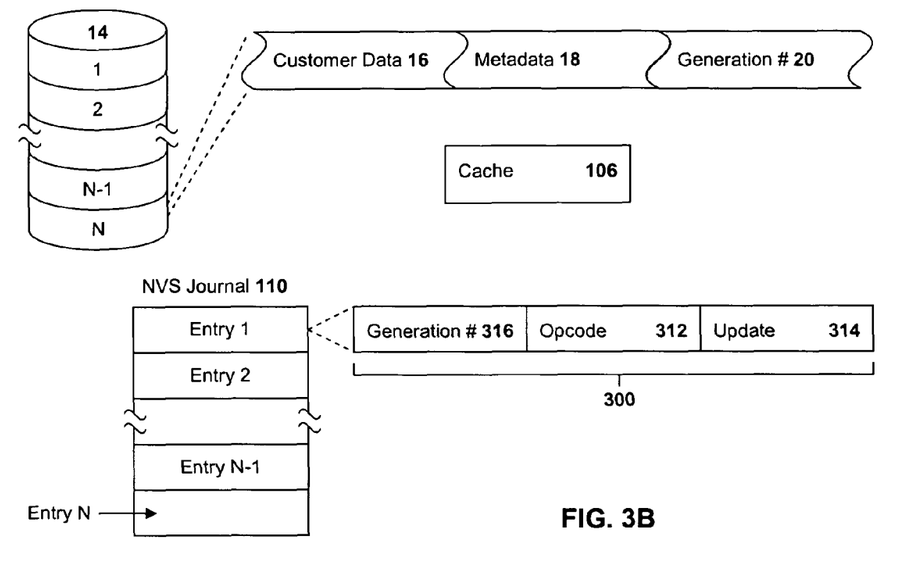
Figure 3C:
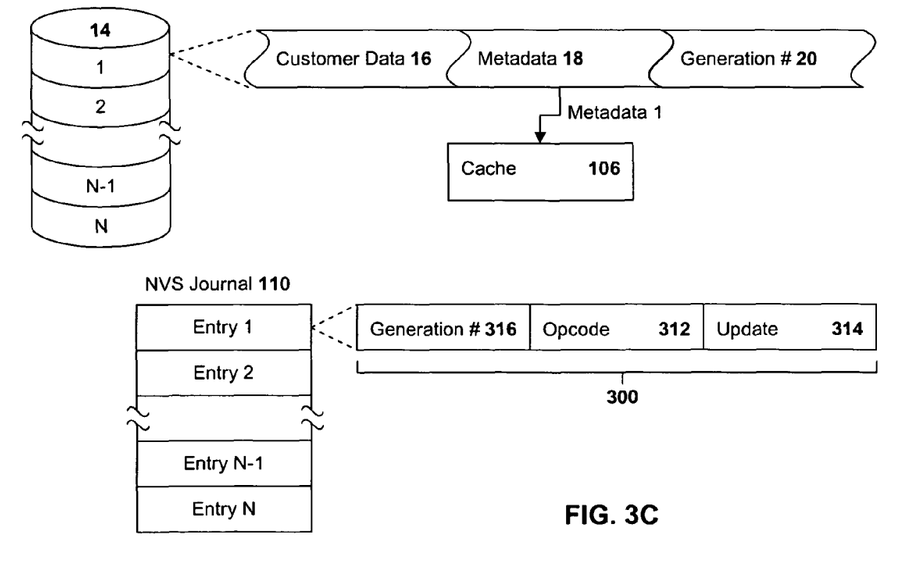
Figure 3D:
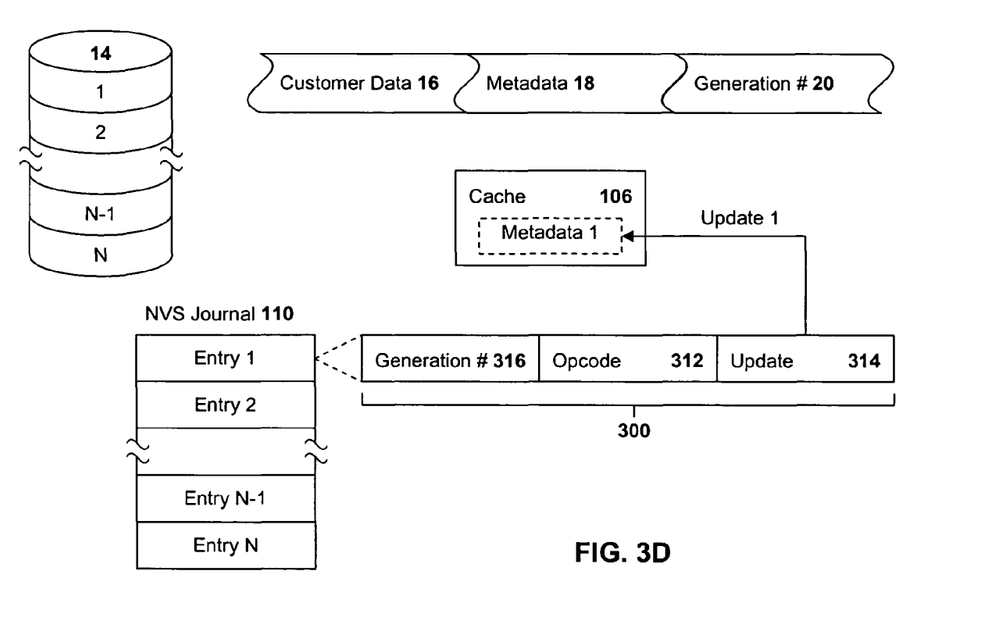
Figure 3E:
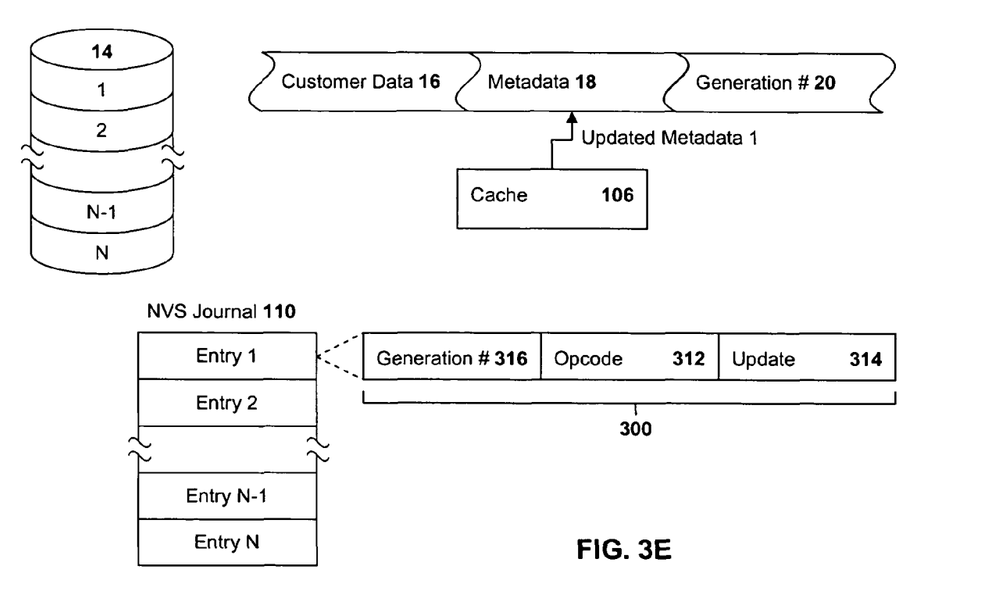

In operation, an order is determined for processing the N metadata tracks participating in an update operation. Next, locks are obtained in the same order on the pages in NVS in which the metadata tracks are stored. Referring now to FIG. 3A, after the locks are obtained, a journal entry 300 is stored in the NVS journal area 110. The journal entry 300 includes the opcode 312, update data 314 and the generation number 316. Journal entries are stored for each of the remaining N metadata tracks in the determined order (FIG. 3B). After all of the journal entries have been stored in the NVS 110, the updates are applied to the metadata tracks on the disk storage by staging the first metadata track from the disk storage 14 to the cache 106 (FIG. 3C). Then, the update 314 from the first journal entry 300 is applied to the cached track (FIG. 3D) and the updated track is destaged back to the disk storage 14 (FIG. 3E). The process is repeated for each of the other metadata tracks in the determined order.

On occasion, the update operation may be interrupted, such as from a power loss or system crash. If all of the journal entries have been stored in the NVS 110, the update operation may be resumed and completed in a "roll-forward" operation after power is restored or the system recovers. If not all of the journal entries have been stored in the NVS 110 when the interruption occurs, those journal entries which have already been stored in the NVS 110, identified by their common generation number, will be discarded in a "roll-back" operation. The update will then be restarted from the beginning.

For example, assume that an opcode Y indicates that one track of type A and a second track of type B would participate in a multi-track update. Track A1 is of type A and track B1 is of type B. During an update, a journal entry has been made for track A1. The journal entry for the track has the opcode Y and a generation number M. If an interruption occurs, the NVS journal 110 will be scanned for an entry for a track of type B with a generation number M. If such an entry is found (that is, if a journal entry for track B1 has been completed), the update operation is resumed and completed by applying the journaled updates to the corresponding metadata tracks. On the other hand, if no such entry is found, the journaled entry for track A1 with generation number M and opcode Y will be discarded; the update operation will have to be restarted.

FIGS. 4A-4M are sequential schematic representations of another embodiment of a metadata update of the present invention. Preferably, a generation number is assigned to metadata tracks and used to identify all tracks participating in a particular multi-track update operation. The generation number is stored in the track and in journal entries. At the beginning of a multi-track update operation, the metadata tracks are scanned to identify the largest generation number which is extracted from the tracks and incremented for use as the generation number for the update operation (although the generation number may instead be incremented at the end of an update operation). Additionally, opcodes are used to identify type of multi-track operations and the number of tracks involved in each operation. Along with generation numbers, opcodes are stored in journal entries. Thus, the generation number and opcode in a journal entry may be used to identify all tracks participating in a multi-track operation.

Figure 4A:
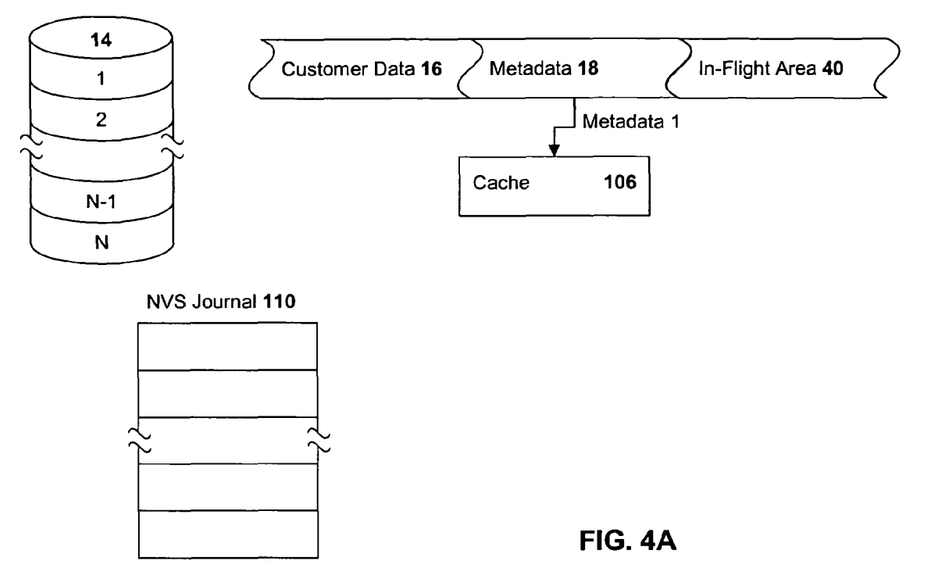
FIGS. 4A-4M are sequential schematic representations of a sequence of a metadata update of another embodiment of the present invention.
Figure 4B:
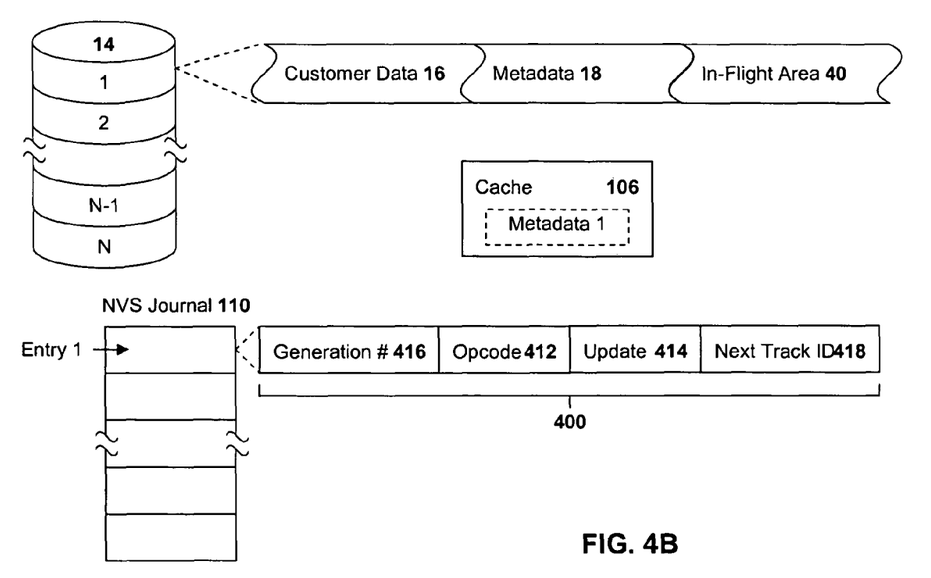
Figure 4C:
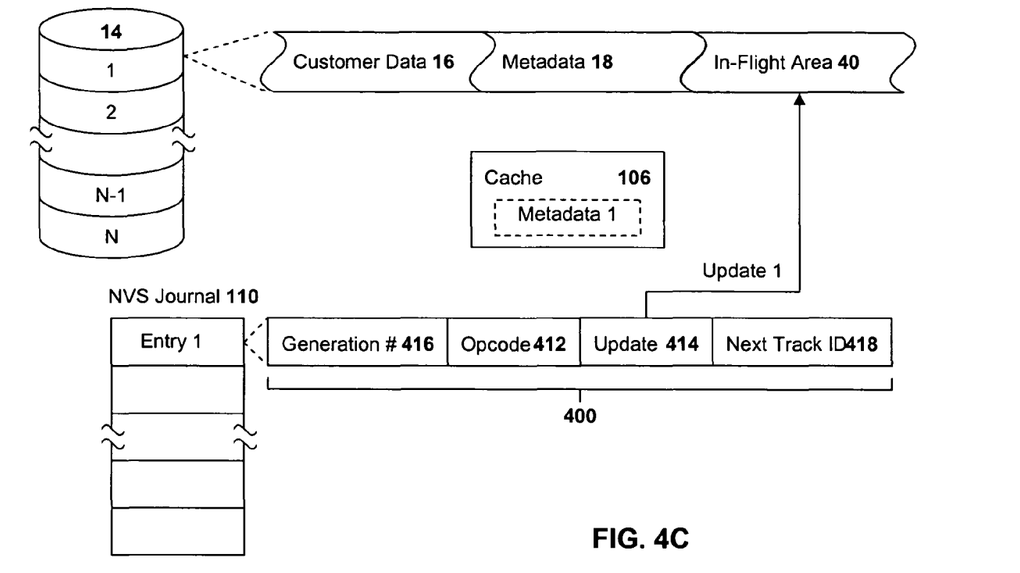
Figure 4D:
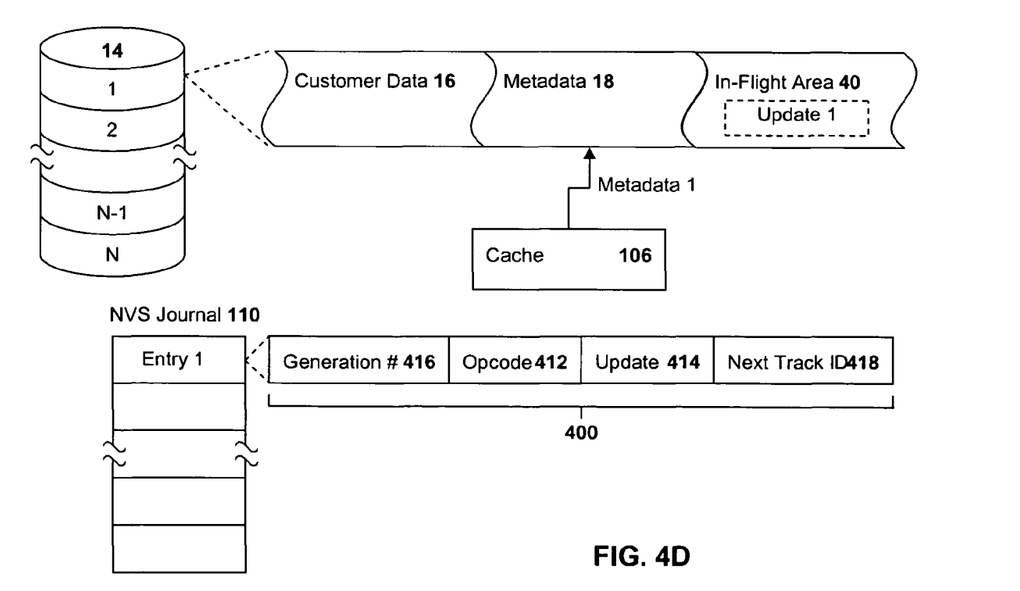
Figure 4E:
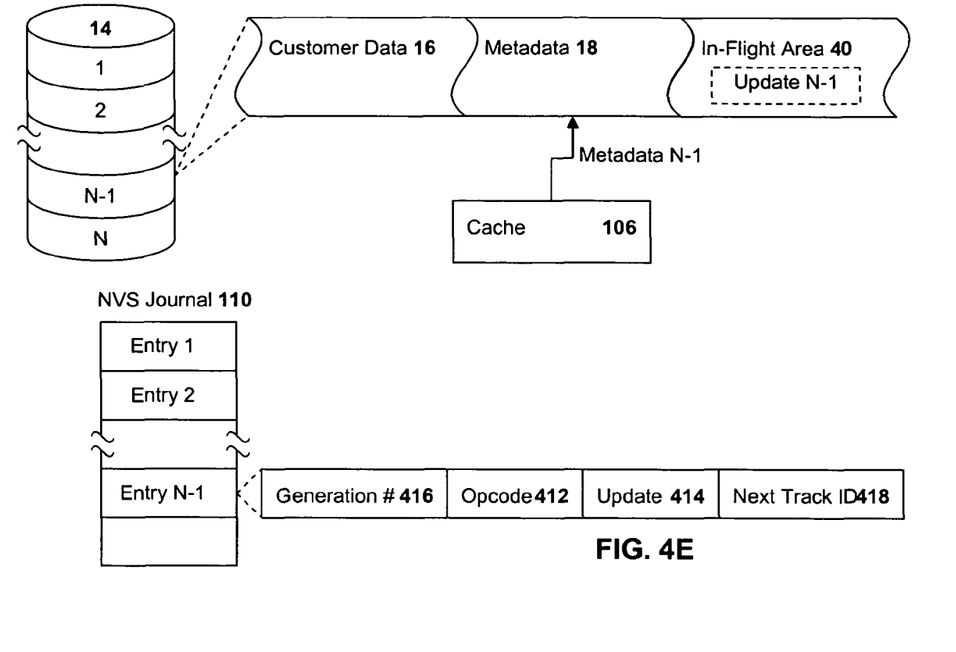
Figure 4F:
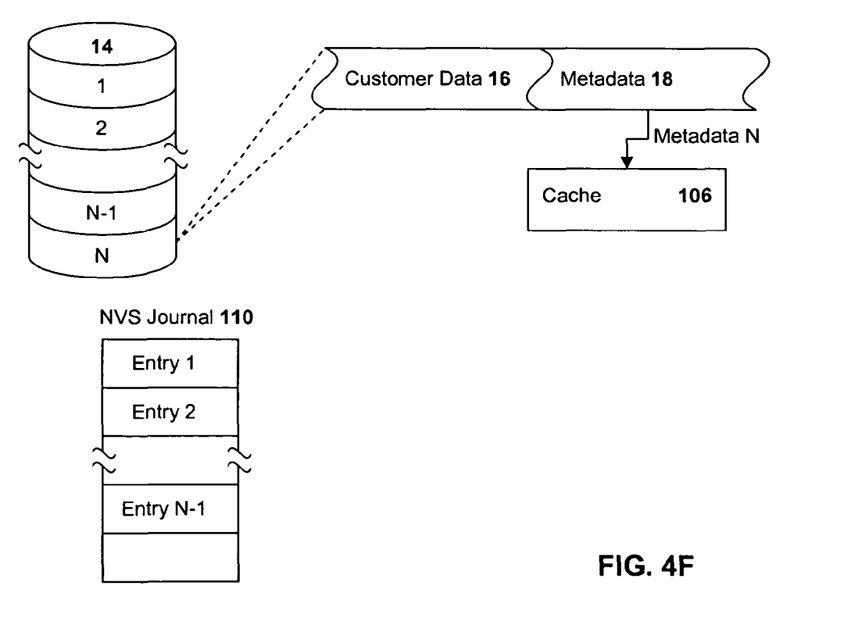

In operation, an order is determined for processing the N metadata tracks participating in an update operation. Next, locks are obtained in the same order on the pages in NVS in which the metadata tracks are stored. Referring now to FIG. 4A, after the locks are obtained, the first metadata track is staged from the disk storage to the cache 106. Next, a journal entry 400 is stored in the NVS journal area 110 (FIG. 4B). The journal entry 400 includes the opcode 412, update data 414 and, if used, the generation number 416. The journal entry 400 may also include an identification of the next partner track 418 participating in the update operation. Thus, the journal entries may be linked with each pointing to the next. After the journal entry 400 for the first metadata track is stored, the journal lock is released and the journal entry 400 (including the generation number 416) and the update data 414) are applied to a temporary holding area in the physical track of the storage device 14 (FIG. 4C). The temporary holding area, referred to as the "in-flight area" 40 of the track, is configured to be large enough to hold the updates. Valid update data is indicated if the generation number in a track's in-flight area 40 is greater than the generation number in the track itself. After the journal entry 400 is applied to the in-flight area 40, the track is destaged from the cache 106 back to the track (FIG. 4D). The process is repeated for the second through N–1$^{st}$ metadata track (FIG. 4E).

Figure 4G:
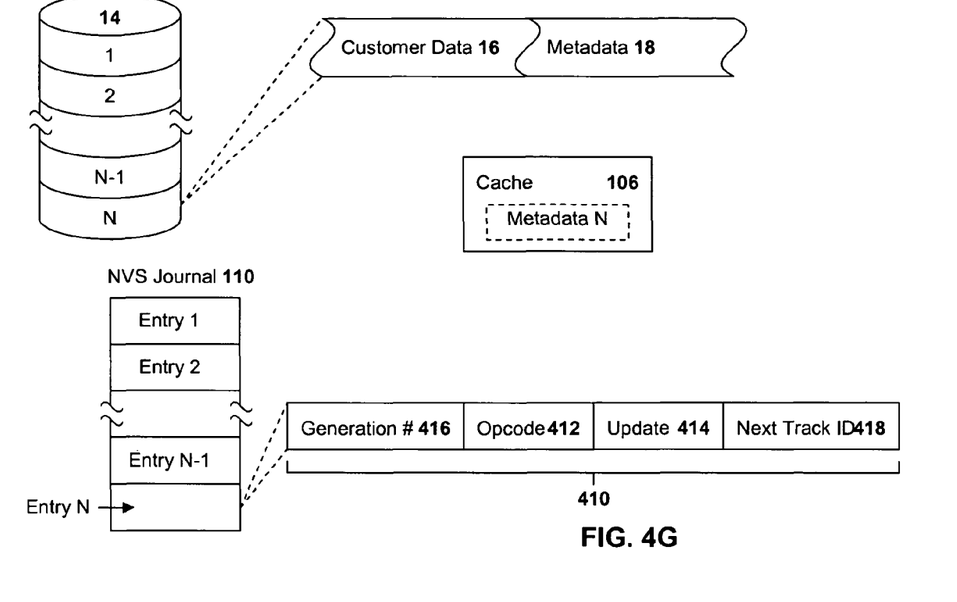
Figure 4H:
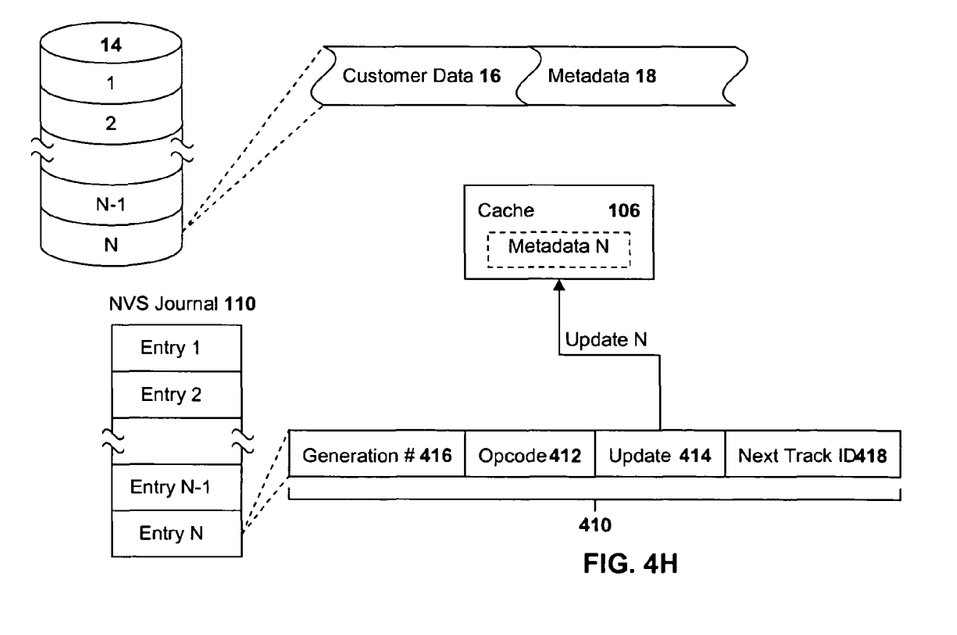
Figure 4I:
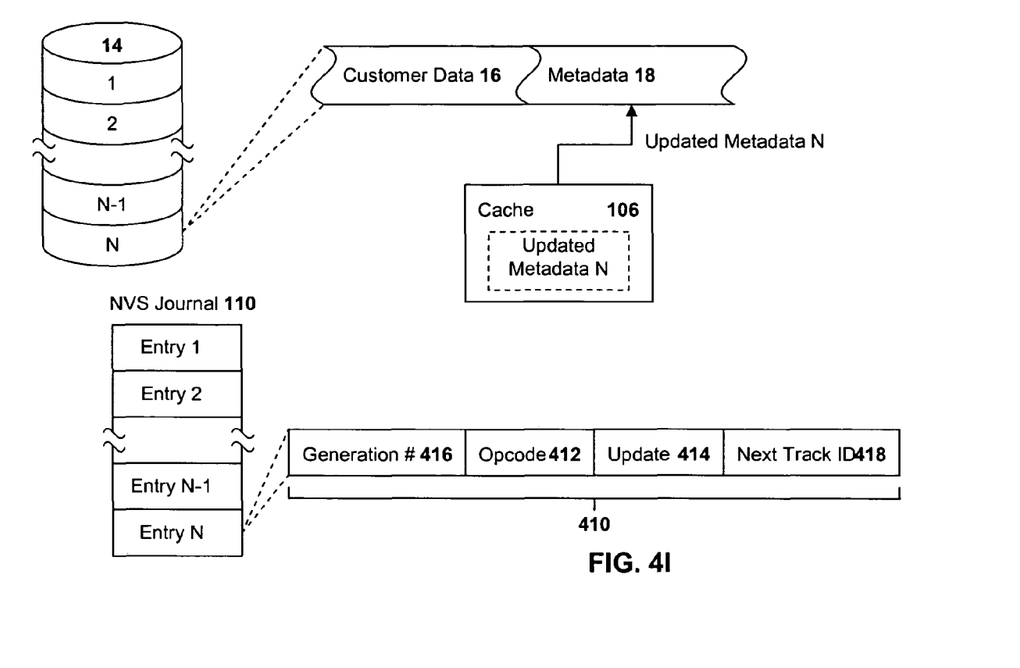

When the Nth metadata track is reached, it is first staged to cache 106 (FIG. 4F), a journal entry 410 is stored in the NVS journal area 110 and the journal lock released (FIG. 4G). Then, the update from the journal entry 410 is applied to the cached metadata track without being stored in an in-flight area (FIG. 4H) and destaged back to the disk storage (FIG. 4I).

Figure 4J:
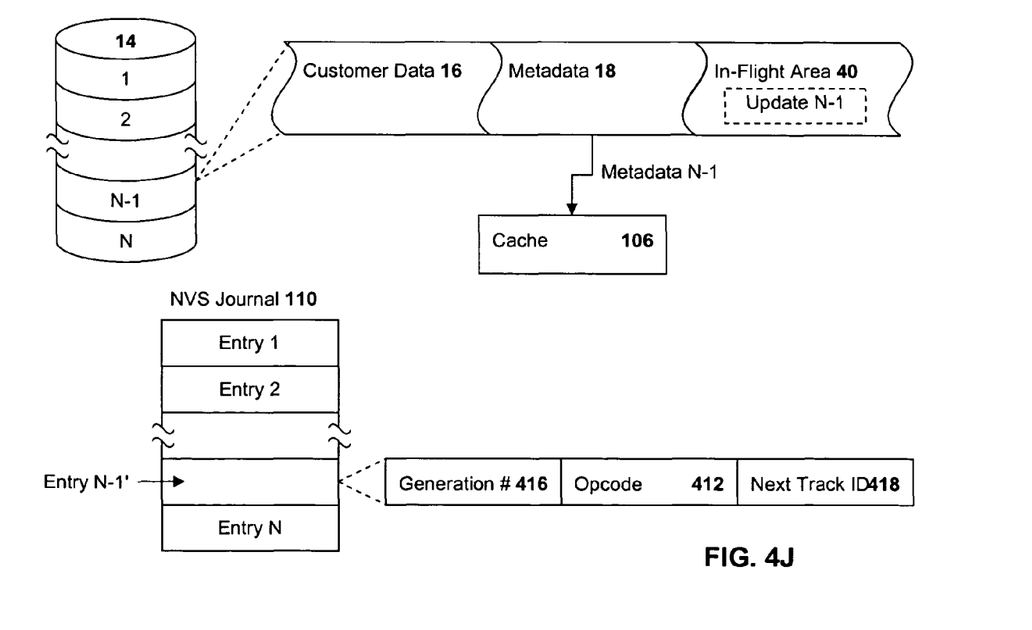
Figure 4K:
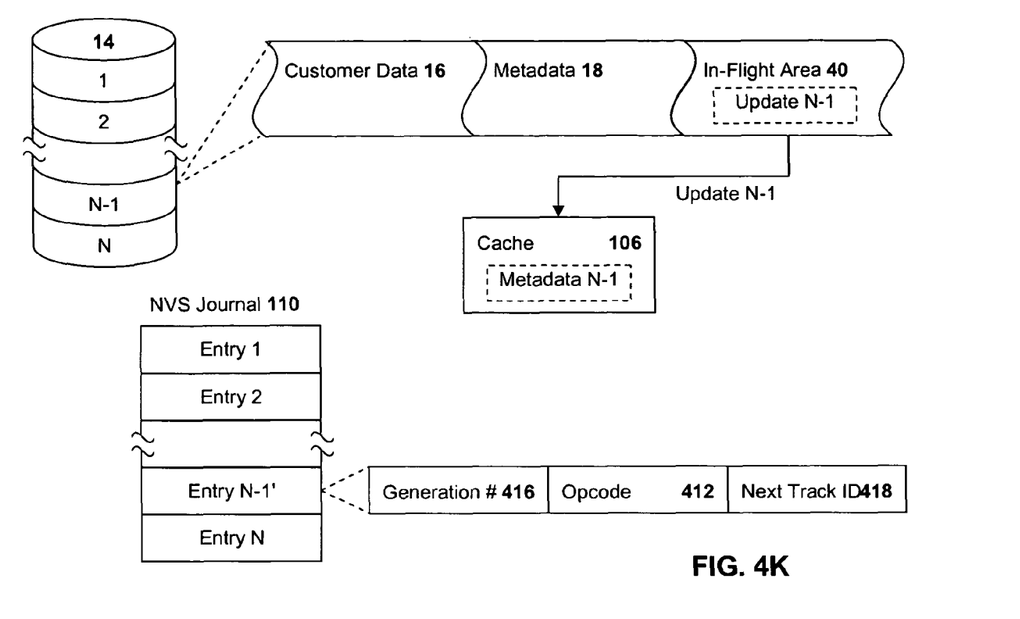
Figure 4L:
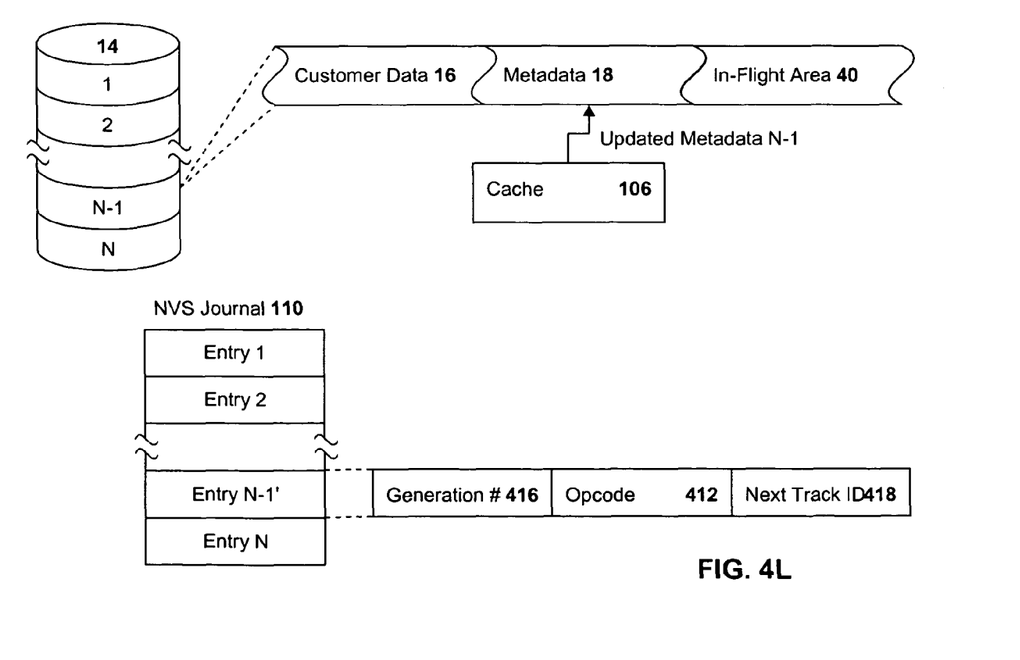
Figure 4M:
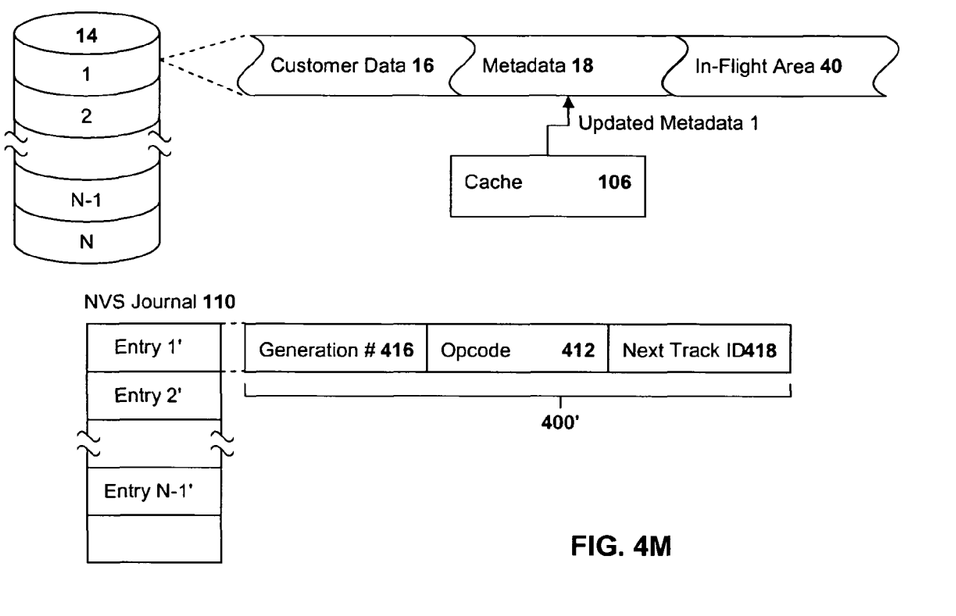

Next, a journal lock is obtained on the N–1$^{st}$ track which is staged to cache and a journal entry made to the NVS journal (FIG. 4J). The journal entry includes the opcode 412 and generation number 416 but not the update data 414. The journal lock is released and the update data in the in-flight area is applied to the cached metadata track (FIG. 4K). The generation number in the in-flight area is also applied to the track and the contents of the in-flight area are marked 'invalid'. The track is then destaged from the cache to the disk storage (FIG. 4L). After the N–1$^{st}$ track has been updated, the routine proceeds in an order which is the reverse of the determined order until the first metadata track has been updated (FIG. 4M).

As with the previously described embodiment, the update operation may be interrupted, such as from a power loss or system crash and a roll-back or roll-forward may be required as part of the recovery. Until the update for track N has been entered into the journal 110, any interruption to the update operation will require a roll-back while any interruption after the update for track N has been entered will employ a roll-forward.

For example, assume that an opcode Y indicates that one track of type A, a second track of type B and a third track of type C would participate in a multi-track update. Track A1 is of type A, track B1 is of type B and track C1 is of type C. During an update, a journal entry has been made for track A1 and ahs a valid in-flight entry. The in-flight entry identifies track B1 as a partner track. Track B1 is examined, after being staged if necessary. If there is no in-flight data for track B1, then the generation number of track B1 is compared with the in-flight generation number of track A1. If there is in-flight data for track B1, the next track is examined and the process repeated until a track with no in-flight data is found, such as track C1. When such a track is found, the generation number of the track (C1 in the example) is compared with the in-flight generation number of the previous tracks (B1 and A1). If the generation numbers are equal, the in-flight areas are rolled-forward to apply the in-flight data to tracks with valid in-flight areas. If, on the other hand, the generation numbers are not equal, the in-flight areas are marked 'invalid', discarding the incomplete updates and performing a roll-back.

It is important to note that while the present invention has been described in the context of a fully functioning data processing system, those of ordinary skill in the art will appreciated that the processes of the present invention are capable of being distributed in the form of a computer readable medium of instructions and a variety of forms and that the present invention applies regardless of the particular type of signal bearing media actually used to carry out the distribution. Examples of computer readable media include recordable-type storage media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for managing global metadata or a method for deploying computing infrastructure comprising integrating computer readable code into a computing system for managing global metadata.

What is claimed is:

1. A method for performing atomic updates on metadata tracks in a storage subsystem, comprising:

assigning to a plurality of metadata tracks a generation number identifying a most recent multi-track update operation in which the metadata tracks participated whereby all of the metadata tracks which participated in the same most recent multi-track update operation are assigned the same generation number;

commencing a new update operation on the plurality of the metadata tracks by storing a first journal entry in a nonvolatile storage (NVS), the journal entry including an opcode and metadata update data, the opcode identifying a type of update to be performed and a number of metadata tracks being updated;

determining the largest generation number in each of the selected metadata tracks being updated;

incrementing the generation number in each of the selected metadata tracks being updated;

staging a first of the metadata tracks being updated from a disk storage to a cache storage;

storing a second journal entry in a nonvolatile storage (NVS) the NVS for the first metadata track, the second journal entry comprising the opcode, the update data for the first metadata track, and the incremented generation number;

repeating the staging, storing and journaling steps for each other metadata track being updated in the new update operation;

applying each journaled update to the respective metadata track in the cache storage;

destaging each of the metadata tracks from the cache storage to the disk storage; and managing an interruption encountered while performing the new update operation by:

after the storage subsystem recovers from the interruption, searching all of the second journal entries of the metadata tracks being updated for the incremented generation number to determine if the second journal entries have been made for all metadata tracks being updated;

if the second journal entries have been made for all metadata tracks being updated, applying each journaled update to the respective metadata track in the cache storage; and if journal entries have been made for fewer than all metadata tracks being updated, discarding the second journal entries from the NVS and recommencing the new update operation.

2. The method of claim 1, further comprising:

after each second journal entry for all except a last of the metadata tracks being updated is stored in the NVS, applying the second journal entry of the first metadata track to an in-flight area;

after the second journal entry for the last of the metadata tracks being updated is stored in the NVS, applying the journaled update for the last metadata track to the respective metadata track in the cache storage; and after destaging the last of the selected metadata tracks being updated from the cache storage to the disk storage and in an order which is the reverse of the order in which the second journal entries for the metadata tracks being updated were stored in the NVS:

staging a metadata track to the cache storage;

storing a second journal entry in NVS for the metadata track, the second journal entry comprising the generation number and the opcode;

applying the update data stored in the in-flight area to the respective metadata track in the cache storage; and destaging the metadata track from the cache storage to the disk storage.

3. The method of claim 2, wherein the in-flight area comprises a disk storage area.

4. A system for performing atomic update on metadata tracks in a storage subsystem, comprising:

a cache storage;

a nonvolatile storage (NVS);

a memory comprising computer-executable instructions that when executed by a processor perform the method comprising:

assigning to a plurality of metadata tracks a generation number identifying a most recent multi-track update operation in which the metadata tracks participated whereby all of the metadata tracks which participated in the same most recent multi-track update operation are assigned the same generation number;

commencing a new update operation on the plurality of the metadata tracks by storing a first journal entry in a nonvolatile storage (NVS), the journal entry including an opcode and metadata update data, the opcode identifying a type of update to be performed and a number of metadata tracks being updated;

determining the largest generation number in each of the selected metadata tracks being updated;

incrementing the generation number in each of the selected metadata tracks being updated;

staging a first of the metadata tracks being updated from a disk storage to a cache storage;

storing a second journal entry in a nonvolatile storage (NVS) the NVS for the first metadata track, the second journal entry comprising the opcode, the update data for the first metadata track, and the incremented generation number;

staging each other metadata track being updated in the new update operation;

journaling each other metadata track being updated;

applying each journaled update to the respective metadata track in the cache storage;

destaging each of the metadata tracks from the cache storage to the disk storage; and managing the atomic update after an interruption encountered while performing the atomic update, by:

after the storage subsystem recovers from the interruption, all of the second journal entries of the metadata tracks being updated for the incremented generation number to determine if the second journal entries have been made for all metadata tracks being updated;

if the second journal entries have been made for all metadata tracks being updated, applying each journaled update to the respective metadata track in the cache storage; and if journal entries have been made for fewer than all metadata tracks being updated, discarding the second journal entries from the NVS and recommencing the new update operation.

5. The system of claim 4, further comprising:

applying the second journal entry to an in-flight area after each second journal entry for all except a last of the metadata tracks being updated is stored in the NVS;

applying the journaled update for the last of the metadata tracks being updated to the respective metadata track in the cache storage after the second journal entry for the last of the selected metadata track is stored in the NVS; and after destaging the last of the selected metadata tracks being updated from the cache storage to the disk storage and in an order which is the reverse of the order in which the second journal entries for the metadata tracks being updated were stored in the NVS:

staging a metadata track to the cache storage;

storing a second journal entry in NVS for the metadata track, the second journal entry comprising the generation number and the opcode;

applying the update data stored in the in-flight area to the respective metadata track in the cache storage; and destaging the metadata track from the cache storage to the disk storage.

6. The system of claim 5, wherein the in-flight area comprises a disk storage area.

7. A computer program product of a computer readable storage medium usable with a programmable computer, the computer program product having computer-readable code embodied therein for performing atomic updates on global metadata tracks in a storage subsystem, the computer-readable code comprising instructions for:

assigning to a plurality of metadata tracks a generation number identifying a most recent multi-track update operation in which the metadata tracks participated whereby all of the metadata tracks which participated in the same most recent multi-track update operation are assigned the same generation number;

commencing a new update operation on the plurality of the metadata tracks by storing a first journal entry in a nonvolatile storage (NVS), the journal entry including an opcode and metadata update data, the opcode identifying a type of update to be performed and a number of metadata tracks being updated;

determining the largest generation number in each of the selected metadata tracks being updated;

incrementing the generation number in each of the selected metadata tracks being updated;

staging a first of the metadata tracks being updated from a disk storage to a cache storage;

storing a second journal entry in a nonvolatile storage (NVS) the NVS for the first metadata track, the second journal entry comprising the opcode, the update data for the first metadata track, and the incremented generation number;

repeating the staging, storing and journaling steps for each other metadata track being updated in the new update operation;

applying each journaled update to the respective metadata track in the cache storage;

destaging each of the metadata tracks from the cache storage to the disk storage; and managing an interruption encountered while performing the new update operation by:

after the storage subsystem recovers from the interruption, searching all of the second journal entries of the metadata tracks being updated for the incremented generation number to determine if the second journal entries have been made for all metadata tracks being updated;

if the second journal entries have been made for all metadata tracks being updated, applying each journaled update to the respective metadata track in the cache storage; and if journal entries have been made for fewer than all metadata tracks being updated, discarding the second journal entries from the NVS and recommencing the new update operation.

8. The computer program product of claim 7, further comprising instructions for:

after each second journal entry for all except a last of the metadata tracks being updated is stored in the NVS, applying the first journal entry of the first metadata track to an in-flight area;

after the second journal entry for the last of the metadata tracks being updated is stored in the NVS, applying the journaled update for the last metadata track to the respective metadata track in the cache storage; and after destaging the last of the metadata tracks being updated from the cache storage to the disk storage and in an order which is the reverse of the order in which the second journal entries for the metadata tracks being updated were stored in the NVS:

staging a metadata track to the cache storage;

storing a second journal entry in NVS for the metadata track, the second journal entry comprising the generation number and the opcode;

applying the update data stored in the in-flight area to the respective metadata track in the cache storage; and destaging the metadata track from the cache storage to the disk storage.

9. The computer program product of claim 8, wherein the in-flight area comprises a disk storage area.

* * * * *